United States Patent [19]

Nelligan

[11] 4,012,712
[45] Mar. 15, 1977

[54] SYSTEM FOR TELEMETERING WELL LOGGING DATA

[75] Inventor: William B. Nelligan, Danbury, Conn.

[73] Assignee: Schlumberger Technology Corporation, New York, N.Y.

[22] Filed: Mar. 31, 1975

[21] Appl. No.: 563,507

[52] U.S. Cl. .................. 340/18 CM; 340/15.5 BH; 340/18 P; 181/102; 181/103; 324/.5 G

[51] Int. Cl.² ......................................... G01V 1/40

[58] Field of Search ............. 340/15.5 BH, 18 CM, 340/18 P, 150, 172.5; 181/102, 103; 324/.5 G

[56] References Cited

UNITED STATES PATENTS

| | | | |
|---|---|---|---|
| 3,148,353 | 9/1964 | Schumann | 340/172.5 |
| 3,438,019 | 4/1969 | Gowan | 340/150 |
| 3,559,163 | 1/1971 | Schwartz | 340/18 R |
| 3,657,694 | 4/1972 | Lindsey | 340/18 CM |
| 3,792,430 | 2/1974 | Niven | 340/18 P |
| 3,821,696 | 6/1974 | Harrell et al. | 340/18 P |
| 3,824,533 | 7/1974 | Adamson | 340/18 P |
| 3,831,149 | 8/1974 | Job | 340/172.5 |
| 3,959,767 | 5/1976 | Smither et al. | 340/18 P |

OTHER PUBLICATIONS

Evans, "Status and Trends in Logging," 2/70, pp. 93–112, Geophysics, vol. 35, No. 1.

Primary Examiner—Nelson Moskowitz
Attorney, Agent, or Firm—Brumbaugh, Graves, Donohue & Raymond

[57] ABSTRACT

In the particular embodiments described, a telemetering system for well logging receives and temporarily stores binary-coded parallel data in a downhole memory unit and continuously interrogates and transmits the stored data to the surface at fixed rate in binary-coded serial format. The system thus accommodates high instantaneous data-generation rates, such as are encountered, for example, in gamma ray spectroscopy tools, without loss of information on the cable. The stored data is compacted, by suppressing leading zeros in data words, prior to application to the cable. This affords faster memory read-out and reduces cable transmission time. The data word format and signal format utilized on the cable provide low error-rate data flow to the surface, as well as facilitating the maintenance of synchronous operation between downhole and uphole functions. In one embodiment, the system also includes multiplexed access to the memory unit for data generated both at random and at predetermined intervals, thereby enabling different types of information to be obtained with a single logging tool.

22 Claims, 8 Drawing Figures

SYSTEM FOR TELEMETERING WELL LOGGING DATA

BACKGROUND OF THE INVENTION

1. Field of the Invention

The present invention relates generally to well logging apparatus and methods, and pertains in particular to improved telemetering apparatus and methods for receiving and transmitting information from well logging tools to the earth's surface.

2. The Prior Art

In most well logging applications, full advantage of the information-gathering capabilities of the downhole equipment can be realized only through processing of the downhole data at the earth's surface, whether this be done at the well site or remotely. It is important, therefore, that the downhole data be transmitted to the surface as free as possible of noise or other disturbing effects and, if possible, without loss of information-bearing content. Available logging cables, however, have limited frequency responses beyond which further information-bearing signals cannot be transmitted in an effective way. The result is that in certain logging situations the downhole data is lost or distorted in transmission, with consequent degradation in the quality of the information provided by the surface processing equipment. This problem is particularly acute in logging tools in which the downhole data is generated at high instantaneous rates, such as gamma ray spectroscopy tools for instance, or where plural types of data are generated concurrently and compete for cable time.

Various systems for telemetering well logging data have been proposed in the past to overcome these difficulties in data transmission. One such system is described in U.S. Pat. No. 3,559,163, granted on Jan. 26, 1971 to R. J. Schwartz, and assigned to the assignee of this application. The Schwartz system includes a provision for downhole storage of output pulses from one or more information-gathering transducers and for interrogating the stored data at a rate enabling transmission of the data from storage to the earth's surface within the frequency response capacity of the cable. Where the logging tool includes a plurality of transducers, provision is also made for storing the data from each transducer and for applying it to the cable on a time-sharing basis. Although the Schwartz system represents a useful prior art approach in the area of well tool information transmission, other telemetering methods and apparatus having still further improved characteristics and advantages are desired.

SUMMARY OF THE INVENTION

In order to eliminate some of the noise present in data flow from downhole transducing equipment used in well logging operations, a downhole telemetering system has been developed which employs a memory unit. The input to the memory unit can be any suitable transducer capable of analog to digital conversion of well logging information. In particular, a spectroscopy tool or pulse height analyzer is used in conjunction with the system and the circuitry of the system is especially adapted for efficiently coding spectroscopy information. The memory unit is comprised of a number of memory locations of which a relatively large number are devoted to the storage of spectroscopy information. An energy pulse received by the spectroscopy tool is converted into a number corresponding to a memory location and the data in that particular memory location is incremented by one thereby providing a history of the frequency which different energy levels are sensed by the spectroscopy tool.

Other analog to digital transducers are connected to particular memory locations and their outputs are stored in such locations until there is a memory readout cycle in which all of the information in the memory unit is sent uphole to information processing equipment.

In a particular embodiment of the invention, a tapered memory unit, which has less storage capacity at particular memory locations in recognition of the statistical expectation of information receipt, is used.

The information received by the telemetering system is in the form of a binary number. Information is transmitted uphole by the telemetering system serially in a coded format, including a parity bit.

It is therefore a general object of the invention to provide new and improved methods and apparatus for transmitting well tool information to the earth's surface.

It is another object of the invention to provide a telemetering system for well logging data which includes a downhole digital memory unit having a plurality of individually addressable locations for temporarily storing data and associated memory interrogating and coding components for applying the stored data to the cable at a rate allowing transmission to the surface without loss.

It is a further object of the invention to provide a downhole digital memory unit of the type referred to which is capable of receiving and storing data from one or more information-gathering transducers and wherein access of the data from the several transducers to the memory unit may be synchronous or asynchronous.

Still a further object of the invention is to provide data coding and transmission methods and apparatus which compact the stored data prior to transmission so as to economize memory unit interrogation and cable transmission times.

A further object of the invention is to provide new and improved data word and cable signal formats which afford low error-rate data transmission over a logging cable.

Yet another object of the invention is to compact the data stream for uphole transmission by suppression of leading zeros from data transmitted uphole.

BRIEF DESCRIPTION OF THE DRAWINGS

The foregoing and other objects, features, and advantages of the invention will be more readily understood from the following detailed description of an exemplary embodiment of the invention, taken in conjunction with the accompanying drawings, in which.

DETAILED DESCRIPTION OF AN EXEMPLARY EMBODIMENT

As mentioned, the present invention affords improved methods and apparatus for temporarily storing digitized data in a downhole memory unit and for transmitting the data to the surface without significant data loss in transmission. It thus has particular utility in connection with logging tools which generate data at high instantaneous rates and/or which include plural sources of data which must be applied to the cable on a time-sharing basis. For illustrative purposes, therefore, a representative embodiment of the invention is described and illustrated herein in the environment of a tool embodying functions of both natures, i.e., high instantaneous data inputs and plural data sources. It will be understood, however, that this is merely exemplary of but one of the various applications for which the invention is suitable.

Figure 1:
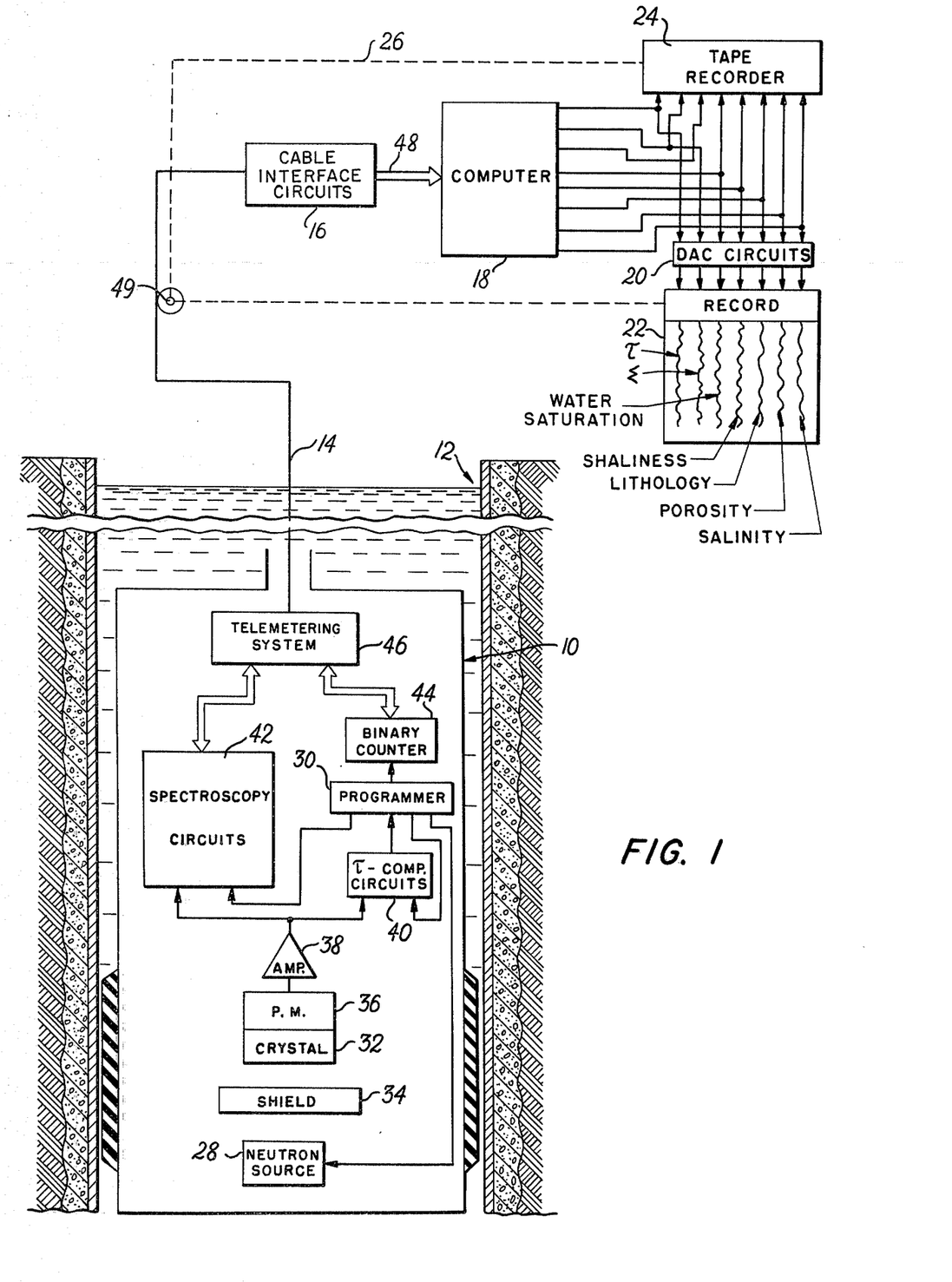
FIG. 1 is a schematic view of an illustrative well logging system to which the present invention has application.

FIG. 1 illustrates a logging tool 10 suspended in a borehole 12 by an armored cable 14. Illustratively, the tool 10 may be of the combined thermal neutron decay time-spectroscopy type disclosed in copending, commonly-owned U.S. Pat. application Ser. No. 563,359, filed Mar. 31, 1975 by Stephen Antkiw, for "Neutron Characteristic and Spectroscopy Logging Methods and Apparatus." The cable 14 provides the usual connections between the tool 10 and the uphole electronics, which include cable interface circuits 16, a computer 18, digital-to-analog converter circuits (DAC's) 20, a visual recorder 22 and a magnetic tape recorder 24. Computer 18 suitably is a general purpose digital computer, such as that manufactured by Digital Equipment Corporation, Maynard, Massachusetts, under the designation PDP-11. The recorders 22 and 24 are coupled to the cable 14 by the usual mechanical linkage 26 for making the customary records of logged values as a function of tool depth. Appropriate power supplies (not shown) are provided at the surface and in the well tool for driving the uphole and downhole electronics.

As described in the aforementioned application Ser. No. 563,359, the pertinent portions of which are hereby incorporated herein, the tool 10 includes a pulsed neutron source 28 which, under the control of a programmer 30, emits successive pulses of 14 Mev neutrons into the formations surrounding the borehole 12. Gamma radiation resulting from interactions between the neutrons and formation nuclei, e.g., inelastic scattering, thermal neutron capture, etc., is detected by a scintillation crystal 32. The usual shield 34 is interposed between the crystal 32 and the neutron source 28. The crystal 32 is optically coupled to a photomultiplier tube 36 which, in response to the incidence of a gamma ray on crystal 32, generates a pulse signal whose amplitude is representative of the energy of the gamma ray. Output pulses from the photomultiplier 36 are amplified in preamplifier 38 and are thereafter coupled to the thermal neutron decay time ($\tau$) computation circuits 40 and to the spectroscopy circuits 42 of the well tool 10, as is fully described in the referenced portions of the aforementioned Antkiw application Ser. NO. 563,359.

The specific construction of the $\tau$-computation circuits 40 may be in accordance with the teachings of Frentrop et al. U.S. Pat. No. 3,662,179. Their operation in the combined $\tau$-spectroscopy tool of FIG. 1 is described in detail in Antkiw application Ser. No. 563,359 and need not be repeated in full here except by reference. Briefly, the circuits 40 including gating, counting, comparator and oscillator circuits which are responsive to amplified pulses from the photomultiplier 36 during programmer-controlled measurement intervals to derive, in conjunction with the programmer 30, a measurement of $\tau$, $\Sigma$, or another selected neutron characteristic of the formations under investigation. A digital output representative of the measured value, illustratively $\Sigma$, is developed in a binary counter 44 and applied, in accordance with the present invention, to a specified address in the memory unit of memory and interface circuits 46 in a manner hereinafter described. The pulse duration and repetition rate of the neutron source 28 are preferably automatically governed as a function of the measured neutron characteristic. Control signals are applied from the programmer 30 to the neutron source 28 for this purpose.

According to Antkiw's teachings, the programmer 30 also controls the operation of the spectroscopy circuits 42 as a function of the measured neutron characteristic. At specified intervals, based on a measured value of the neutron characteristic, following each neutron pulse the output pulses from preamp 38 are gated to the input of a pulse height analyzer (not shown in FIG. 1) in spectroscopy circuits 42. The pulse height analyzer measures the peak amplitude of each incoming pulse and outputs a digital number representative thereof, and it may take any construction appropriate to that purpose. For example, it may be of the single-ramp (Wilkinson run-down) type or of the successive-approximation type. In accordance with the present invention, the digital outputs from the analyzer are temporarily stored in preassigned addresses in the memory unit of circuits 46, as is described hereinafter, and are thereafter transmitted, along with the $\Sigma$ information, over cable 14 to the surface.

The apparatus and methods employed in storing and transmitting these data comprise the present invention and are described in detail below. In the interest of an orderly description of the overall operation of the Antkiw logging system, however, a brief discussion of the surface data manipulation steps is first presented.

At the earth's surface, the $\Sigma$-related signals from the binary counter 44 and the signals from pulse height analyzer are amplified, decoded, and otherwise processed as needed in circuits 16 for coupling over a conductor bundle 48 to the computer 18. The computer develops values of one or both of $\Sigma$ and $\tau$ and of the desired spectroscopy outputs, such as, for example, values indicative of water saturation, shaliness, lithology, porosity, water salinity, etc. Digital representations of these values are transmitted through conductors to the tape recorder 24 and digital-to-analog converter (DAC) 20, which generate analog signals proportional to the respective inputs for application to the visual recorder 22. Monitoring data (not illustrated), such as the average count rate during the first $\tau$-detection interval (I) or the sonde head voltage for example, may also be recorded. The tape recorder 24 and the visual recorder 22 are conventional and are suitable to produce the customary record of logging signals as a function of tool depth. The usual cable-following mechanical linkage, indicated diagrammatically at 49 in FIG. 1, is provided for this purpose.

Figure 2:
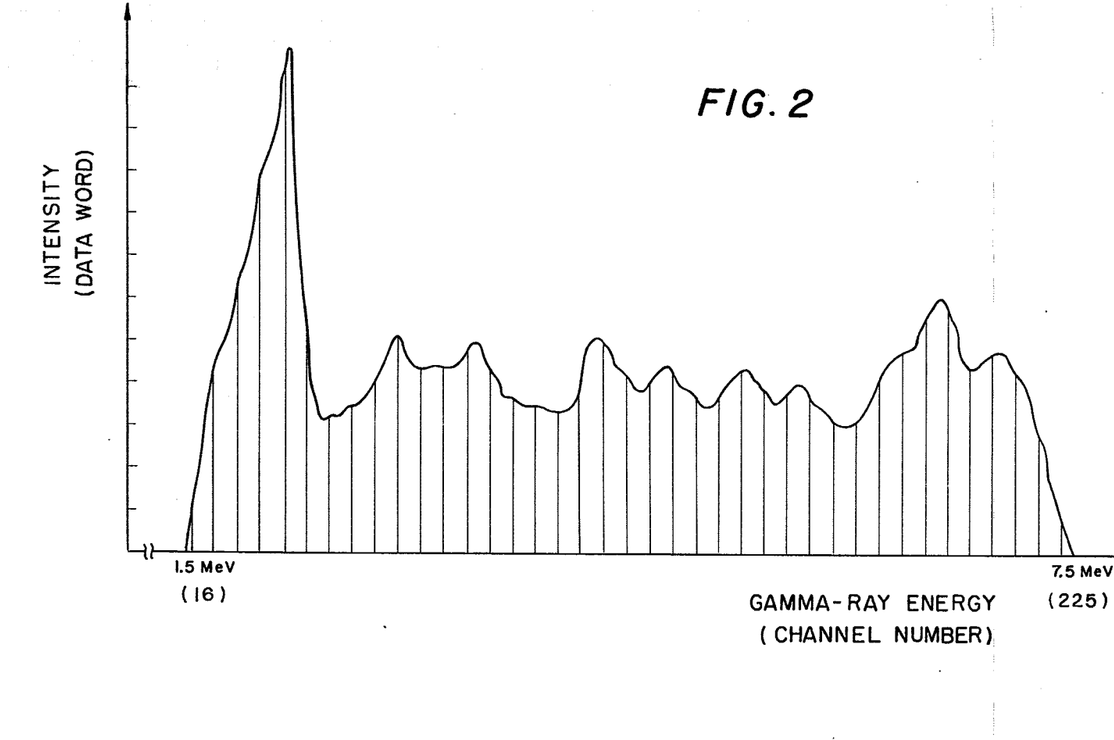
FIG. 2 is a graphical representation of a typical capture gamma ray energy spectrum.

Generally, the number of channels, channel width, energy discrimination levels and other characteristics of the pulse height analyzer in spectroscopy circuits 42 will be selected in accordance with the requirements of the analysis to be performed. For the purpose of developing thermal neutron capture gamma spectra in accordance with the teachings of Antkiw application Ser. No. 563,359, for example, the portion of the capture gamma spectrum which is to be analyzed might extend from 1.5 Mev to 7.5 Mev. The number of channels used over the energy range of interest is dependent upon the desired precision of analysis and the resolution capabilities of the detector crystal 32. For instance, with a thallium-activated sodium iodide crystal, on the order of 200 channels over the energy range of 1.5 Mev to 7.5 Mev has been found suitable. A typical gamma ray spectrum produced in these conditions might appear as depicted in FIG. 2, wherein the distribution of gamma ray intensities (relative number of counts) over the energy range of interest (1.5–7.5 Mev) is shown with respect to the corresponding channels (16–255). Other energy ranges or energy-to-channel distributions may of course be used. For instance, if a higher resolution detector is used, such as a germanium (lithium) solid state detector, for example, on the order of 2000 channels might be used over the 1.5–7.5 Mev range.

ORGANIZATION AND DATA FLOW OF TELEMETERING SYSTEM

Figure 3:
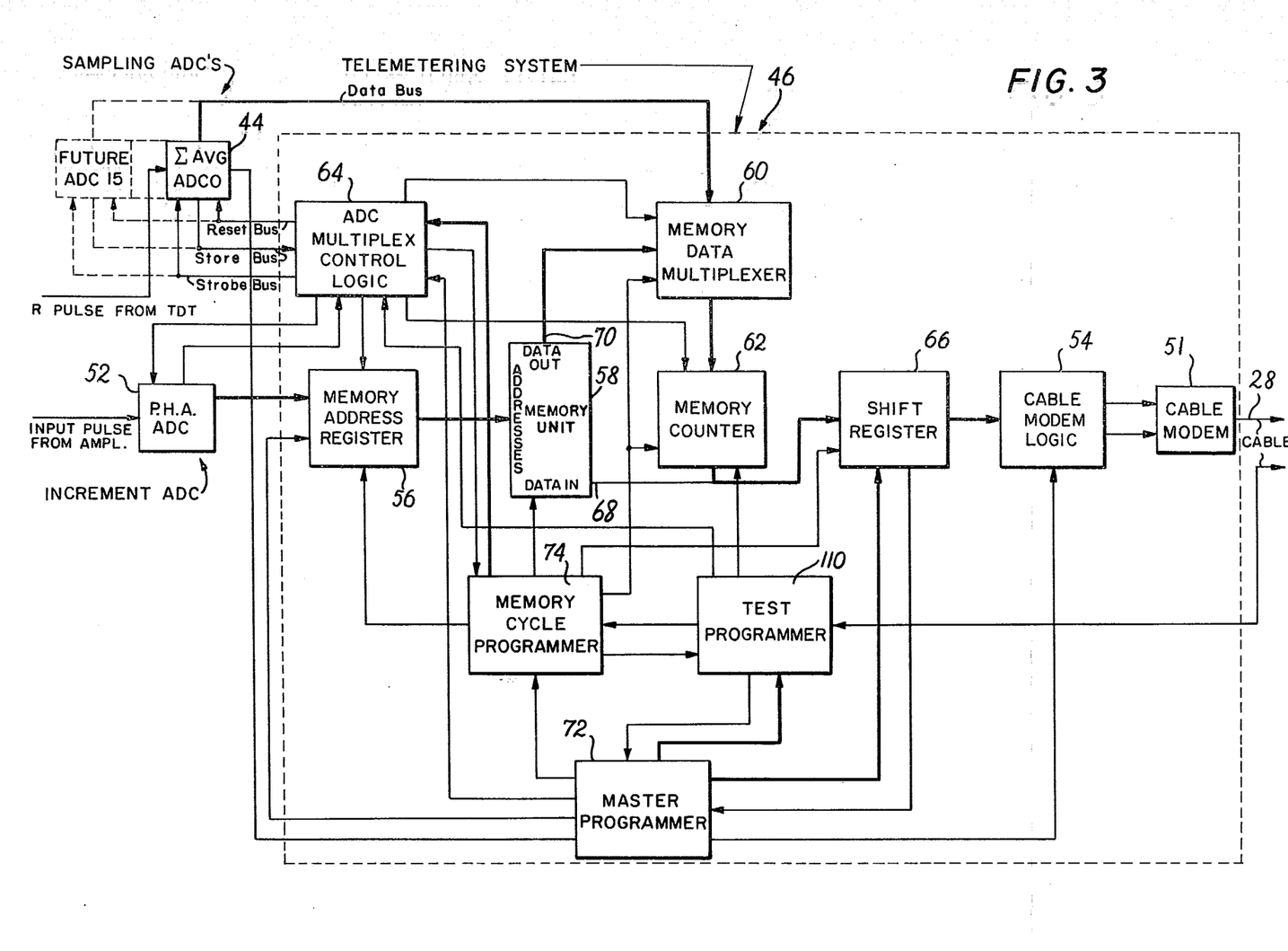
FIG. 3 is a block diagram of one embodiment of a telemetering system constructed in accordance with the invention.

Turning now with more particularity to the telemetering system 46 of the invention, FIG. 3 illustrates in diagrammatic form the basic organization and data flow sequences of an embodiment which, in accordance with the invention, is especially adapted for use in a plural function tool of the type described above. The embodiment of FIG. 3 is therefore constructed to accept inputs for two different types or modes of data processing. One input type is represented by the $\Sigma$ information from binary counter 44, this being exemplary of data generated by measurements or samplings made at regular intervals. The other input type is represented by the pulse height information from spectroscopy circuits 42, this being exemplary of data which are characterized by a statistical distribution of random, discrete events. It will be understood that the specific inputs described ($\Sigma$ and gamma ray spectra) are illustrative only, and that, generally, the information handled by the telemetering system may come from any downhole transducing equipment which provides a suitable digital output or whose output may be digitized. In this light, therefore, the binary counter 44 and the pulse height analyzer 52 of the circuits 42 are identified in FIG. 3 by the more general designation of analog-to-digital converters or ADC's. Binary counter 44 is thus the $\Sigma$ ADC and pulse height analyzer 52 (PHA for short) the PHA ADC. As illustrated in phantom at 54 in FIG. 3, and as described hereinbelow, additional sampling-type ADC's may also be provided.

The telemetering system 46 is designed to asynchronously receive parallel digital information in the form of binary numbers from logging tools, store the information in a memory unit 58, and transmit the stored information from the memory unit 58 serially through cable 14 to information processing equipment located uphole. Information which is randomly received by the logging tools is collected, stored in the memory unit 58 and then efficiently coded and transmitted uphole in a steady stream. Data losses in transmission are minimized, because the uphole processing equipment expects transmission in a specified format, including a parity bit. Compacting the data stream also means that spaces which were formerly present in the data streams of well logging tools are filled with additional information, so more than one type of well logging tool or transducer can be utilized and multiplexed as will be explained hereinafter.

The information handled by the telemetering system 46 comes from any type of downhole transducing equipment which provides a suitable digital input to the system 46. In particular, well logging tools capable of analog-to-digital conversion of thermal neutron decay time measurements and spectroscopy measurements are suitable. Sonic tools or other transducers may also be used. For convenience, the spectroscopy tool or pulse height analyzer 52, which measures the amplitude of a voltage pulse from a photomultiplier tube and converts the analog information into a digital representation will hereinafter be called the "increment ADC". The transducers which supply other information, such as thermal neutron decay time measurements, will be called sampling ADC's, and the sampling ADC's and increment ADC will collectively be called ADC's.

The telemetering system 46 comprises a memory address register 56, a memory unit 58 connected to the output of the memory address register 56, a memory data multiplexer 60 connected both to the output of the memory unit 58 and to the sampling ADC's and having its output connected to a memory counter 62. ADC multiplexer control logic 64 is used to determine the particular ADC used to load the memory unit 58. The output of the memory counter 62 is connected both to the data input of the memory unit 58 and to a shift register 66 used for parallel-to-serial conversion of the data for application to cable modem logic 50 which prepares the data for a cable modem 51 which modulates it for transmission uphole.

The memory unit 58 is comprised of 512 memory locations each of which holds data in the form of a binary number. The memory unit 58 is divided into two 256 word blocks, called Block One and Block Two. Block One is subdivided into memory locations 0 through 15 and 16 through 255. Memory locations 16 through 255 of Block One store spectroscopy information for which the telemetering system 46 is primarily used. Said locations correspond to gamma ray energies between 1.5 Mev and 7.5 Mev. The energy spectrum of interest is divided into sections of approximately equal energy ranges. Each section of the energy spectrum is assigned a memory location numbered from 16 through 255. When the increment ADC 52 senses a gamma ray energy within the range 1.5 Mev to 75 Mev, it automatically associates the received energy with a channel number between 16 and 255. Thus, for example, the increment ADC 52 might associate an energy of 4.5 Mev with memory location 125.

The lower portion of Block One, corresponding to memory locations 0 through 15 stores information from the sampling ADC's. For example, thermal decay time measurements made by a thermal neutron decay or TDT tool can be assigned to memory location 1 in Block One. All sampling ADC's are associated with a specific memory location, but the increment ADC is associated with a major portion of Block One and the data received by the increment ADC determines the specific memory location.

Block Two, corresponding to memory locations 256 through 511, stores information relating to testing and calibrating the increment ADC and the other ADC's. As described in the aforementioned Antkiw application Ser. No. 563,359 and as further disclosed in the co-pending, commonly-owned United States application Ser. No. 563,510, filed Mar. 31, 1975 by Richard Murphy, for "Methods and Apparatus for Pulse Height Analyzer Offset Control", calibration of the spectroscopy circuits 42 of the combined $\tau$-spectroscopy tool illustrated in FIG. 1 preferably is carried out periodically during a logging run. Conveniently, the outputs of the PHA ADC corresponding to the calibration inputs and fully described in the Antkiw and Murphy applications, are stored in Block Two of memory 58. At the initiation of each calibration cycle, referred to in the Antkiw application as the stabilization period within each basic $31\tau$ cycle of tool operation, a control signal is sent from the programmer 30 (see FIG. 1) to the spectroscopy circuits 42 causing 256 to be added to the channel number which would otherwise be assigned to a particular input by the PHA ADC. This shifts all of the calibration data to the memory locations of Block Two.

Each of the sampling ADC's has an output register which is assigned a binary number when the ADC receives information about the formation. Each sampling ADC connects to the store bus for indicating to the ADC multiplex control logic 64 that the ADC has information for the memory unit 58. The information from a particular ADC cannot be forwarded to the memory unit 58 until the ADC multiplex control logic 64 initiates transfer of information from that particular ADC.

Each ADC sends a store signal to the ADC multiplex control logic 64, when the ADC is ready to forward information. The multiplex control logic 64 determines whether a sampling ADC or the increment ADC will be able to forward its data to the memory unit 58. In general, a priority is given to the increment ADC 52, because the increment ADC receives information at a greater frequency than do the sampling ADC's.

The multiplex control logic 64 sends a reset signal over a reset bus to the ADC which has transferred its information for input to the memory. The exact manner in which priority is determined and the transfer takes place will be discussed hereinafter.

MEMORY INPUT BY INCREMENT ADC

Figures 4, 5:
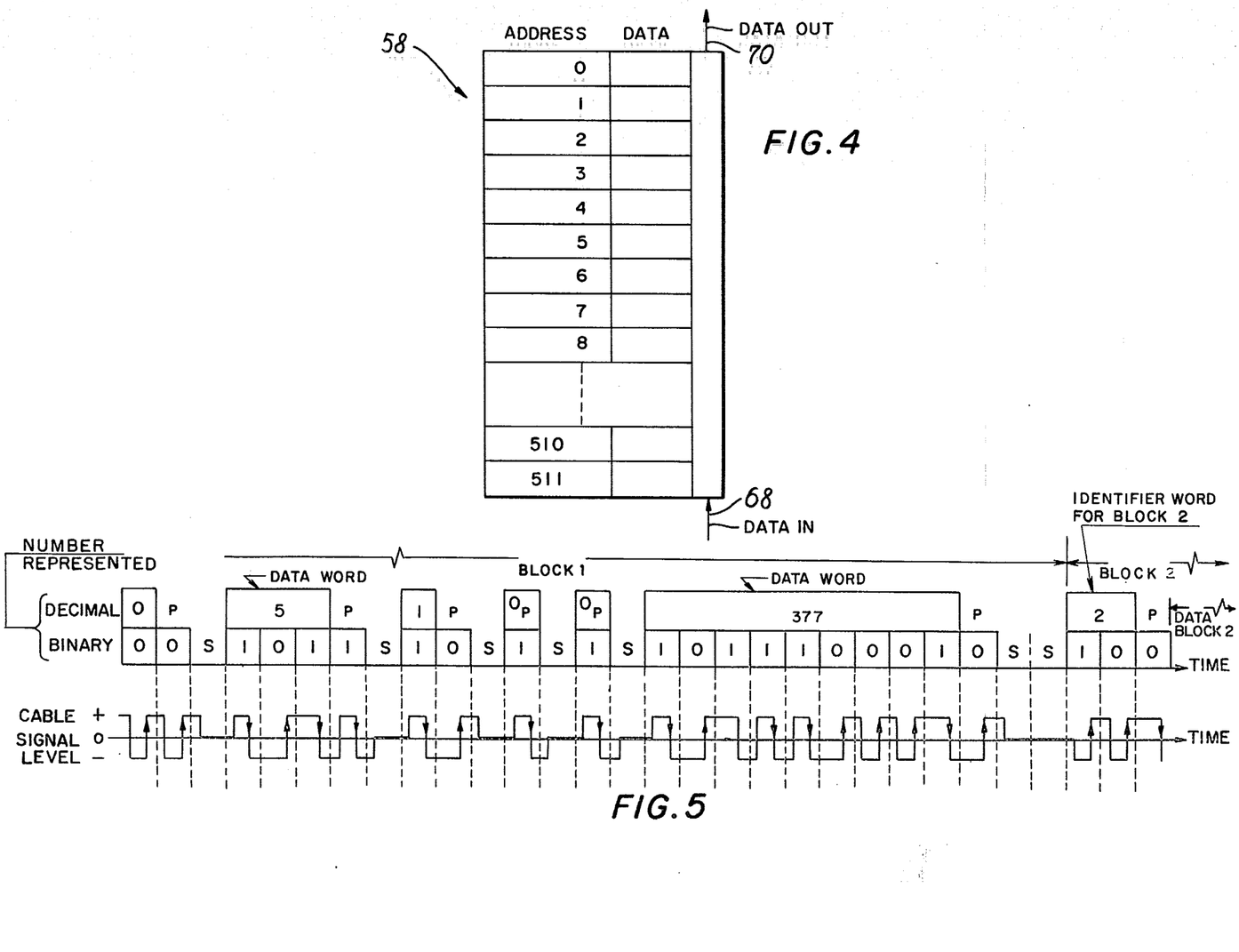
FIG. 4 is a schematic view illustrating a representative layout of the downhole digital memory unit.
FIG. 5 is a diagrammatic view depicting the preferred data word format and cable signal format of the invention.

Referring generally to FIG. 4, the layout of the memory unit 58 is shown. The memory unit 58 comprises a series of 512 memory locations numbered consecutively from 0 to 511. The 512 memory locations will be referred to hereinafter as either locations or channels, each having its own memory address. The memory unit 58 is addressed to a particular channel by the memory address register 56. When a particular channel had been addressed, data may be inserted into or removed from the memory location at the data input 68 or the data output 70 respectively.

Referring generally to FIG. 2, a typical gamma ray energy spectrum received by a spectroscopy tool is shown as a graph of Intensity vs. Gamma Ray Energy. The gamma ray energy spectrum can be divided into the number of discrete portions corresponding to the number of channels in the memory unit 58 used to store spectroscopy information. When the increment ADC recognizes a particular gamma ray energy, it converts the energy into a binary number corresponding to a channel number used for storing spectroscopy information. The increment ADC sends a store signal to the ADC multiplex control logic 64 to indicate that it has information to transmit, and the binary number is transferred to the memory address register 56 upon receipt of a signal from the memory cycle programmer 74. As a result of the asynchronous timing with which the increment ADC receives information, it is necessary to use this type of hand-shake system to indicate the readiness of one processing unit to receive information from another unit. The data in the address designated by the increment ADC is transferred to the memory counter 62 and incremented by 1 in a manner and for reasons to be explained.

Assuming that the memory unit 58 has been initialized by setting the data portion of each of the 512 locations to zero, the receipt of data from the increment ADC through the memory address register 56 causes the data word in the addressed memory location, which was initially zero, to be transferred from the memory unit 58 to the memory data multiplexer 60. The memory data multiplexer 60 forwards the data word to the memory counter 62. The memory counter 62 increments the data word by 1 and then reinserts it through the data input line 68 into the same location in the memory unit 58 from which it was taken. The memory unit 58 is ready to receive additional information as soon as the incremented data word has been entered. While the memory unit 58 transmits a data word to the memory data multiplexer 60 and awaits the receipt of the incremented data word from the memory counter 62, the increment ADC is able to receive additional information. However, the memory unit 58 is unable to accept additional information until it has completed its entry cycle.

The steps outlined above will be repeated many times as the increment ADC sends information until the memory unit 58 has built up a series of numbers in memory locations corresponding to the intensity of count rates at different gamma ray energies. In the graph of Intensity vs. Gamma Ray Energy, Intensity corresponds to the particular data word in a given memory location, while a Gamma Ray Energy corresponds to a particular channel number.

Thus, as shown in FIG. 2, a bar graph having channel numbers, corresponding to Gamma Ray Energies along its x-axis and having bar heights equal in units to the data word contained in each particular channel, i.e., the Intensity of gamma rays detected at a particular energy, is built up in the memory unit 58 and corresponds to the energy spectrum detected by the increment ADC.

MULTIPLEXING ADDITIONAL SAMPLING ADC'S

Referring to the composite spectrum of FIG. 2, at very low gamma ray energies there is very little useful information available. For that reason, the low numbered memory locations of Block One may better be utilized for information other than spectroscopy. It is particularly desirable, therefore, to use the low numbered channels for storing information derived from sampling ADC's. For example, sampling ADC's may provide thermal neutron decay time information. In order to use the low numbered memory locations for this purpose, the sampling ADC's are strobed when the address counter 100 is at the address assigned to the ADC. Only one ADC can enter information into the memory unit 58 at a particular time, so the ADC multiplex control logic 64 determines which ADC will have priority in that regard. Basically, the ADC multiplex control logic 64 determines whether the increment ADC or one of the sampling ADC's will have access to the memory unit 58.

MEMORY DUMP

The data collected by the various ADC's is continuously sent uphole. It is a function of the master programmer 72 to provide the necessary controls for data transmission. The master programmer 72 sends an appropriate signal to the memory cycle programmer 74 initiating a read out cycle. The address counter 100 in master programmer 72 cycles through memory addresses, starting at location zero and continuing through the memory locations sequentially.

The output of the address counter 100 72 is connected both to the memory address register 56 and to the ADC multiplex control logic 64. For memory addresses corresponding to 15 or less the ADC multiplex control logic 64 cycles through the sampling ADC's corresponding to the memory addresses provided by the address counter 100. The ADC multiplex control logic 64 sends a "strobe" signal to the sampling ADC which then forwards data along a data bus to the memory data multiplexer 60. If the corresponding sampling ADC has a "store" signal on the store bus the data is entered into the memory data multiplexer 60 and then goes into the memory counter 62. The data is then written into the memory 58 in the same manner as with the increment ADC except in this case the data is not incremented by 1 before entry.

From the above description, it is to be understood that data from the sampling ADC's does not remain in the memory unit 58, but is simply entered and immediately read out and sent uphole during the subsequent memory read-out and transmission cycle.

For each memory location available to the increment ADC 52, the data portion, corresponding to the number of times that particular memory location has been accessed since the previous memory dump, is read into the memory data multiplexer 60 in parallel. From the memory data multiplexer 60, the data word is forwarded to the memory counter 62 incremented by 1 and then written into the memory 58.

TRANSMISSION FORMAT

Referring generally to FIG. 5, the format of the data transmitted to the uphole signal processing equipment is shown. Data words, i.e., the data in each memory location, are read from the memory unit 58 in parallel form and converted into serial form by the shift register 66 for transmission by the cable modem 51. The cable modem 51 modulates the signal which is sent uphole on the cable 14.

The cable modem logic 54 and the cable modem 51 are used to provide phase modulation for the transmitted signal. A zero is represented by a positive step in the signal level on the cable 14. A one is represented by a negative step. The signal level after a positive step is equal in magnitude but of opposite polarity to the signal level after a negative step.

A space interval, called S, is represented by a period which does not have an output signal. The signal level is brought to zero at the time a reverse step would otherwise occur. Similarly, the signal level is restored at a reverse step point. The steps occur at the ¾ points of the bit intervals, and reverse steps always occur at the ¼ points of the bit intervals.

For all words, the most significant bit is transmitted first, and a parity bit, giving the entire word including the parity bit an odd parity, is transmitted last. Each data word transmitted uphole is preceded by a space interval during which no signal is transmitted. The space interval preferably has the same duration as a bit interval.

The data word sequence shown in FIG. 5 is subdivided into subsequences called data blocks. Each data block is preceded by a double space interval followed by an identifier word which identifies the data block. The identifier word is followed by a single space interval and then by the first data word in the data block. The combination of the data block, identifier word, and the preceding double space interval is called a block. The sequence of blocks which constitutes a complete readout from the memory unit 56 is called a frame.

In an optional readout-transmission mode, transmission may be interrupted upon the completion of each frame. At the end of each frame, a signal (Z) is generated by the test programmer 110. This signal halts the encoding programmer 108 (see FIG. 7), which remains stopped until receipt of a start signal (S). The start signal may be generated after a time interval, as determined for example by the master clock programmer 104, or it may be obtained from an external source. Use of an externally generated start signal allows the telemetering system to operate on a time-sharing basis with other systems not employing the telemetering system.

TAPERED MEMORY

The memory unit 58 is comprised of a number of individual memory chips. The number of chips used for each memory location determines the capacity of that particular location. The maximum expected intensity of the energy spectrum can be determined. The efficiency of the memory unit 58 can be increased in the preferred embodiment of the present invention by building the memory unit 58 with different numbers of memory chips for different memory locations as determined by the expected maximum number to be counted at a particular energy level. The organization of the memory unit 58 will then be tapered, and the memory unit 58 will be called a tapered memory. The tapered memory is made possible by the variable word length feature used in the transmission cycle, because the variable word length feature senses the presence of a zero bit at the output of shift register 66. It should be recognized by one skilled in the art that the use of a tapered memory merely increases the efficiency of the invention and may be deleted without departing from the invention.

OPERATION OF SPECIFIC PORTIONS OF THE TELEMETERING SYSTEM

Having now described the overall operation and construction of the telemetering system of the present invention, specific embodiments of various portions of the system will now be described in greater detail.

MEMORY DATA MULTIPLEXER

Figure 6:
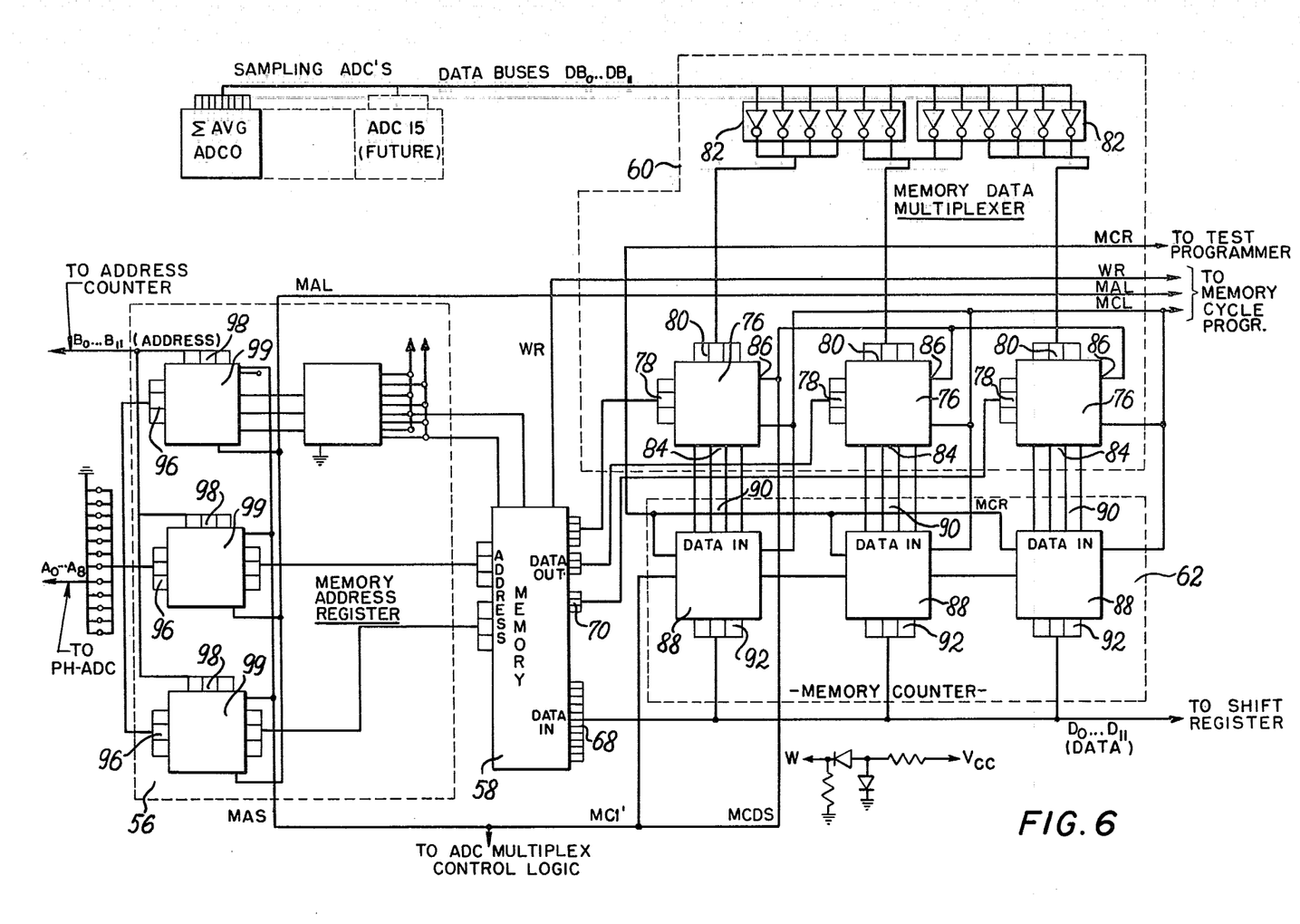
FIG. 6 is a schematic diagram of a portion of the telemetering system of FIG. 3 showing, in greater detail, various portions of the telemetering system.

Referring generally to FIG. 3 and particularly to FIG. 6, the memory data multiplexer 60 is shown schematically. The memory data multiplexer 60 functions as a data traffic controller, receiving data either from one of the sampling ADC's or from the memory unit 58 and forwarding the data to the memory counter 62.

The memory data multiplexer 60 comprises a series of dual input latches 76, which may be thought of as a series of single-pole double throw switches each having a set of first input ports 78 which are permanently connected to the data output 70 of the memory unit 58 and a set of second input ports 80 which are permanently connected to the output ports of a series of inverters 82. The output ports of the sampling ADC's are connected to the input ports of the inverters 82.

The inverters 82 are required in the memory data multiplexer 60 because the sampling ADC's preferably make use of negative logic. In particular, the output ports of the sampling ADC's are wired OR connections to a common data bus from open collector outputs in accordance with standard circuit designs of this type.

In operation, data is passed from the input ports selected to the output ports 84 of the latches which comprise the data output of the memory data multiplexer 60. The selection of the input ports is controlled by the ADC multiplex control logic 64, which sends an appropriate signal to the switching terminal 86 of each of the latches in the standard manner.

MEMORY COUNTER

The memory counter 62 comprises a series of flip-flops 88 which receive data from the memory data multiplexer 60. The input ports 90 of the flip-flops 88 are connected to the output ports 84 of the memory data multiplexer 60, and the output ports 92 of the flip-flops 88 are permanently connected both to the data input 68 of the memory unit 58 and to the input ports of the shift register 66.

The function of the memory counter 62 is to forward data to the memory unit 58. Data which originated in sampling ADC's is forwarded, without change, to the memory unit 58. On the other hand, data which originated in the memory unit 58, representing information from the increment ADC 52, is incremented by one before being returned to the memory unit 58, in accordance with the previously described operation of the telemetering system 46.

The ADC multiplex control logic 64 provides an appropriate signal to the flip-flops 88, in the standard manner, which causes them to increment the data they are holding by one when such incrementing is necessary, i.e., when the increment ADC 52 has initiated the cycle.

MEMORY ADDRESS REGISTER

The memory address register 56 comprises a series of dual input latches 99 each having a first set of input ports 96 connected to the output of the increment ADC 52 and a second set of input ports 98 connected to the output of an address counter 100 (see FIG. 7) which is part of the master programmer 72.

The function of the memory address register 56 is to determine the location in the memory unit 58 which is being accessed and to serve as a buffer register between the increment ADC 52 and the memory unit 58.

The selection of which of the input ports 96, 98 is to be used by the latches 99 is made by the ADC multiplex control logic 64 by an appropriate signal to the latches 99.

MEMORY CYCLE PROGRAMMER

The memory cycle programmer 74 is used to control access to the memory unit 58, both for reading and writing, when directed by either the master programmer 72, for read cycles, or the ADC multiplex control logic 64, for write cycles.

The read and write cycles are, from a control aspect, virtually identical. The major difference between a read cycle and a write cycle is that the memory counter 62, which enters data into the memory unit 58, is destructive on read out, i.e., a zero is written into the memory unit 58 following a read out cycle. In a write cycle, the memory counter 62 either increments by one, if the write cycle was initiated by the increment ADC 52, or writes data directly into the memory unit 58 without alteration, if the data was supplied by a sampling ADC.

The other function of the memory cycle programmer 74 is to load the memory address register 56. As previously explained, the memory address register 56 has two input ports 96, 98. When a read cycle from the memory unit 58 is taking place, the second set of input ports 98 is connected to the master programmer 72, for reasons to be explained hereinafter.

If new information is being entered into the memory unit 58, then the input port selected for the memory address register 56 will be either the first set of input ports 96, if the new information is from the increment ADC 52, or the second set of input ports 98, if the new data is from a sampling ADC.

MASTER PROGRAMMER

Figure 7:
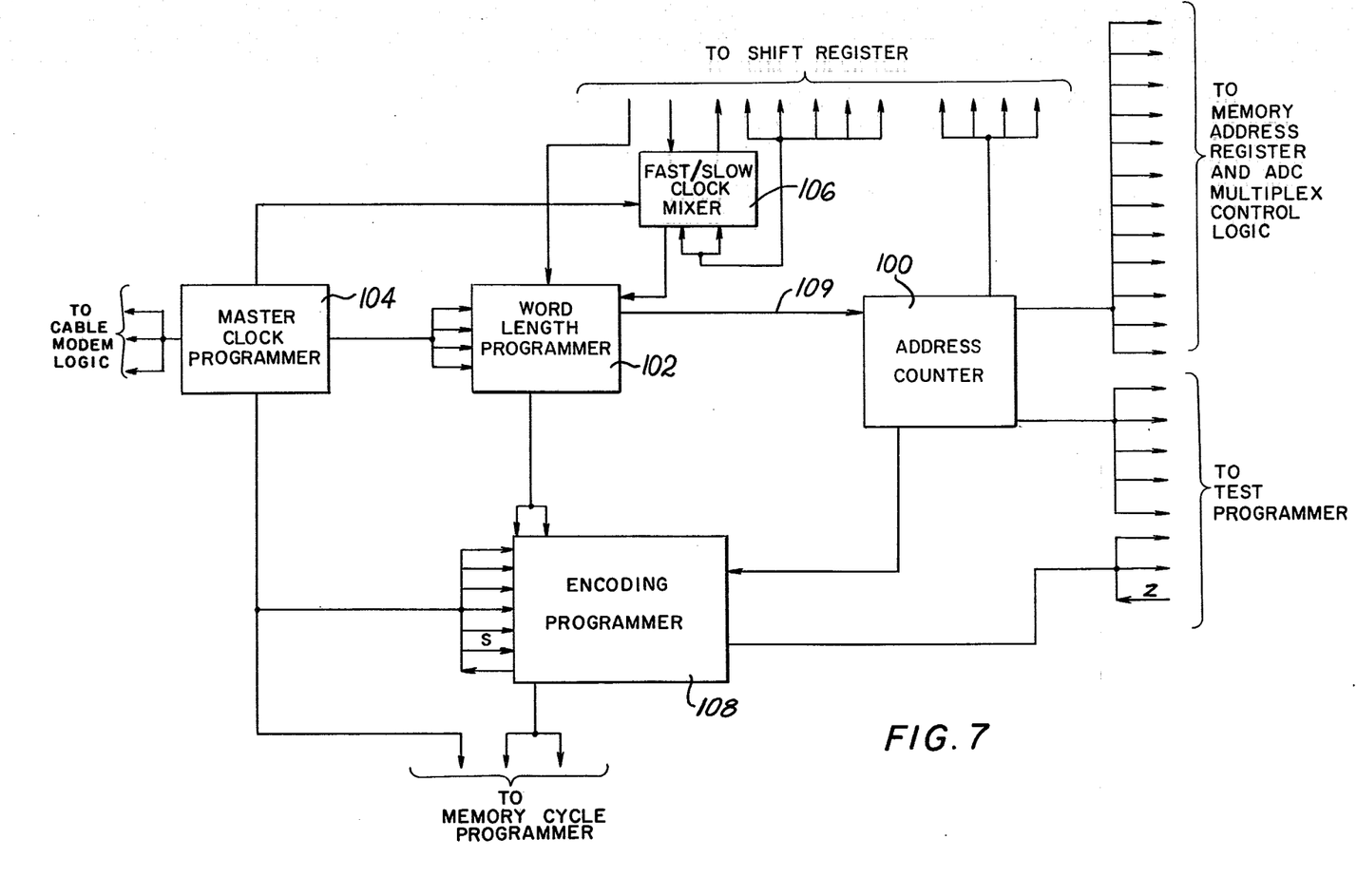
FIG. 7 is a block diagram of the internal portions of the master programmer.

Referring generally to FIG. 3 and particularly to FIG. 7, the master programmer 72 may now be explained in greater detail. A major feature of the telemetering system 46 is that it continuously transmits data uphole from the memory unit 58. In order to facilitate the continuous uphole transfer of data, leading zeros are suppressed. This has the effect of compacting the data stream sent uphole.

The master programmer 72 comprises an address counter 100 which has previously been referred to. The function of the address counter 100 is to provide an address to the memory address register 56. The number in the address counter 100 is continuously updated by one under the control of a word length programmer 102 until the last memory location in the memory unit 58 is reached at which time the address counter 100 resets to zero and again cycles through all locations in the memory unit 58.

Assuming that the telemetering system 46 is in a read cycle, the data in a memory location determined by the address counter 100 will be forwarded by the memory counter 62 to the shift register 66. A master clock programmer 104 having a fixed period between timing pulses of adequate duration to allow time for modulating a single bit of data and transmitting it uphole is connected to the word length programmer 102. The shift register 66 is also connected to the word length programmer 102. When a word from data is being transmitted uphole, the word is shifted through the shift register 66 one bit at a time starting at the most significant bit. The word length programmer 102 receives an indication of "0" bits, until the first "1" bit is received. It is a feature of the telemetering system 46 to compact the data stream transmitted uphole by suppressing leading zeros. Accordingly, the word length programmer 102 causes a fast/slow clock mixer 106 to switch to a much higher frequency clock input than the normal frequency clock input. A pulse from the fast clock causes the shift register 66 to quickly shift to the next bit. This procedure is repeated until the first 1 bit, of the data word is reached whereupon the fast/slow clock mixer switches to the normal clock input. That bit and all following bits will activate the cable modem logic 50 and cable modem 51 to modulate the signal transmitted uphole.

After a complete data word has been transmitted uphole, a parity bit, giving the entire word negative parity is added in the standard manner. Thereafter, the word length programmer 102 sends a signal indicting completion of the transmission of a word to an encoding programmer 108 which interrupts the clock directing the shift register 66 causing a space to be transmitted uphole. As indicated by line 109 in FIG. 7, the word length programmer 102 also causes the address counter 100 to be incremented to the next memory address.

The master programmer 72 controls the telemetering system 46. The highest priority of the telemetering system 46 is to send data uphole, which is a continuous process controlled by the master programmer 72.

At any time during the continuous uphole transmission of data from the memory unit 58 either the increment ADC 52 of one of the sampling ADC's, may receive data for transmission to the memory unit 58. In such event, the particular ADC sends a signal to the ADC multiplex control logic 64 indicating that it has information to be placed in the memory unit 58.

Assuming that the increment ADC has so indicated, the increment ADC 52 adds its data to the memory unit 58 without interruption of the continuous transmission of data. This addition occurs in the manner previously explained, with the data provided by the increment ADC 52 interpreted as a memory address and forwarded to the address inputs of the memory unit 58 by the memory address register 56. This is accomplished through the appropriate set of input ports 96 in the dual input latches 99 of the memory address register 56.

There is no interruption of the continuous uphole transmission of data when the increment ADC 52 adds data to the memory unit 58, because the memory cycle programmer 74 inhibits access to the memory unit 58 by the increment ADC 52 during read out cycles. Entry of data by the increment ADC 52 does not alter the number contained in the address counter 100. Accordingly, after the increment ADC 52 has caused the number contained in the appropriate data location to be incremented by one, in the manner heretofore described, the uphole transmission of data from the memory unit 58 resumes at the memory location remaining in the address counter 100.

Information from the sampling ADC's is treated somewhat differently in that a check is made of a particular sampling ADC associated with a particular memory location only when the address counter 100 reaches the memory location associated with the sampling ADC. After the address counter 100 resets to memory location zero, each sampling ADC is then interrogated in turn to determine if it has data. The particular sampling ADC associated with the memory location being addressed by the memory address register 56, i.e., corresponding to the number contained in the address counter 100, is interrogated by the ADC multiplex control logic 64. if the sampling ADC has data, such data is transmitted through the memory data multiplexer 60, through the memory counter 62 and into the memory unit 58. Such data is almost immediately read from the memory unit 58 and transmitted uphole as previously described, because the address counter 100 is already set to the memory location of that sampling ADC. However, if the store signal from the sampling ADC occurs immediately after the read out and before the address counter 100 has advanced to the next location, the data will be held in the memory unit 58 and read out on the next cycle. After a data word is read from the memory unit 58, a 0 is written into the memory location. After the sampling ADC has forwarded data, its output register is reset to zero and its store signal is removed to indicate that it does not have data available. It is also enabled to make another measurement.

ADC MULTIPLEX CONTROL LOGIC

The ADC multiplex control logic has various control functions which have been previously discussed. One of these functions is to generate an interrogation (strobe) signal to the sampling ADC associated with the address corresponding to the number in the address counter 100.

Figure 8:
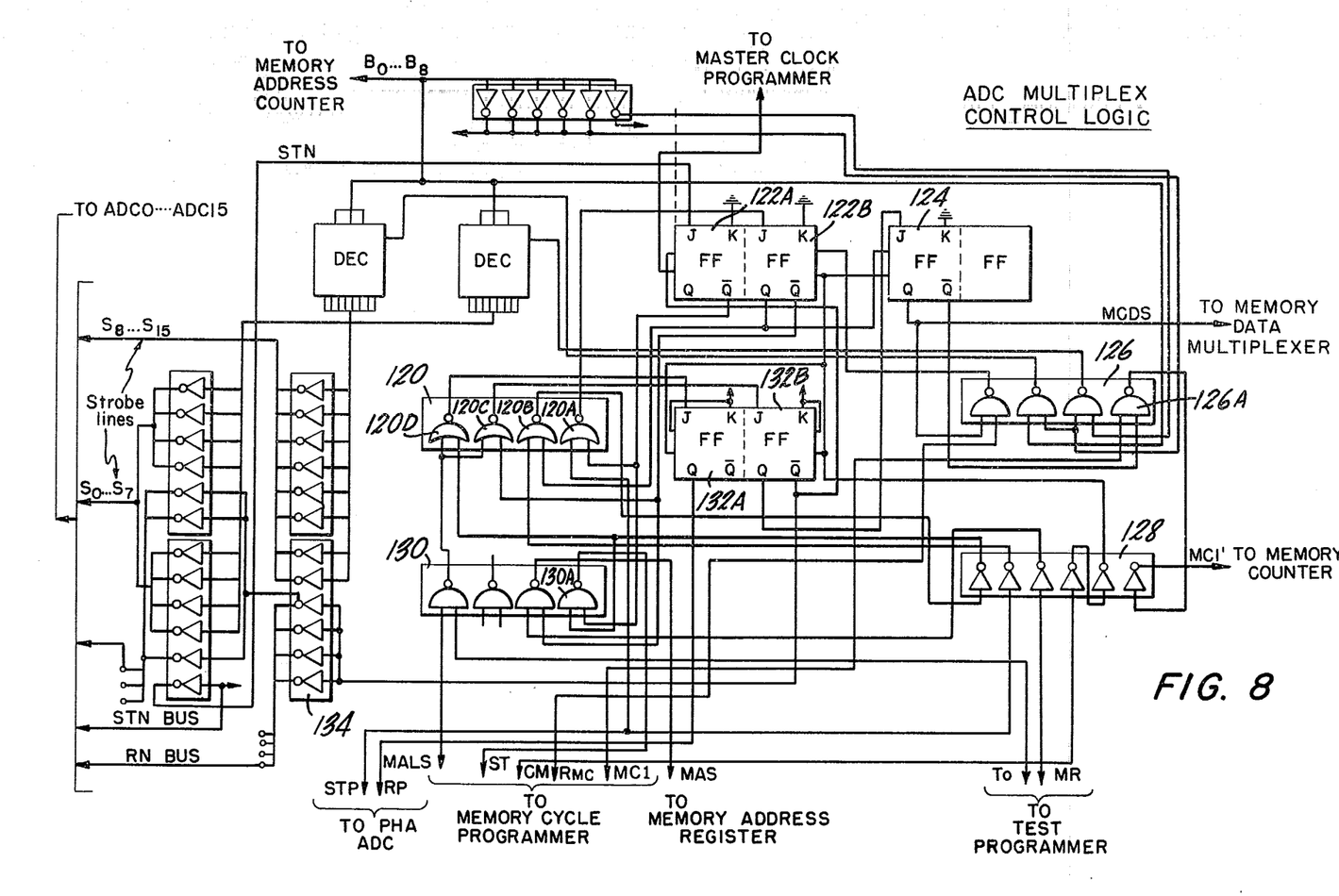
FIG. 8 is a schematic diagram of the ADC multiplexer control logic.

The ADC multiplex control logic 64 also receives the store signals from the ADC's and generates the control signals which enable the ADC's to write their data into the memory unit 58. In particular, dual input latches 76 and 99 located in the memory data multiplexer 60 and in the memory address register 56, respectively, must be set to an appropriate input port depending upon whether a sampling ADC or the increment ADC is trying to access the memory unit 58. Through the use of NOR gates 120, dual J-K flip flops 122, 124, NAND gates 126, 130 and inverter 128, the ADC multiplex control logic 64 determines whether a memory access signal is from a sampling ADC or the increment ADC and generates a signal to set the appropriate input port for each of the dual input latches.

Flip-flop 122A responds to a store signal (STN) from the store bus of the sampling ADC's by changing state. The output Q is connected to the input of a NOR gate 120A. If the "store" signal STP is not already present at the NOR gate 120A from the increment ADC 52, the output of the NOR gate 120A generates a signal causing flip-flop 122B and to change state. The ($\overline{Q}$) output of flip-flop 122B generates a signal causing flip-flop 124 to change state. The output of flip-flop 124 produces a signal (MCDS) which selects the input ports 80 of latches 76, in the memory data multiplexer 60, thereby allowing the sampling ADC's access to memory 58.

The output signal ($\overline{Q}$) of flip-flop 122B goes to a NOR gate 120C which is connected to the input of flip-flop 132B, which generates an output signal ($\overline{Q}$) which is inverted by inverters 134 and applied to the sampling ADC reset bus (RN BUS).

If a store signal (STP) from the increment ADC 52 is applied to NOR gate 120A the signal from flip-flop 122A is prevented from enabling flip-flop 122B, leaving the input ports 78 connected to the latches 76. The STP signal is also applied to inverter 128 and thereafter to NOR gate 120B.

If flip-flop 122B has not been enabled, the output signal from NOR gate 120B is inverted and applied to NOR gate 120D. The output of NOR gate 120D enables flip-flop 132A to generate a reset pulse (RP) to the increment ADC 52.

NAND gate 130A generates a store pulse (ST) for application to the memory cycle programmer 74 upon receipt of a signal either from flip-flop 122A or, through inverter 128, from NOR gate 120B. Each ST signal initiates a memory store cycle. Every memory store cycle generates a signal (MCl) which is passed by NAND gate 126A only if flip-flop 124 has not been enabled. This prevents the memory counter 62 from incrementing by 1 when the data from a sampling ADC is being stored in memory 58. If the MCl signal is passed by NAND gate 126A it is inverted by inverter 128 to produce the increment by one signal (MCl') which is forwarded to the memory counter 62.

TEST PROGRAMMER

Referring generally to FIG. 3, a block known as the test programmer 110 is shown. The principal function of the test programmer 110 is to insert data into the memory unit 58 in a predetermined manner so the output of the telemetering system 46 can be observed uphole to determine that the system 46 is operating properly. Accordingly, there is provision to actuate the test programmer 110 by a signal sent downhole on the cable 28.

When the test programmer 110 is actuated, all of the ADC's are prohibited from having access to the memory unit 58. Thereafter, the test programmer 110 initializes all memory locations to zero. This is simply accomplished by a destructive read cycle of all of the memory locations. In a second test made on successive passes, the test programmer 110 increments each memory location by one and transmits the incremented numbers uphole. To accomplish the increment by one test, the test programmer 110 actuates the memory counter 62 in the same manner as though the increment ADC 52 had actuated the memory counter 62. The difference, however, is that the memory address register 56 is loaded by the address counter 100 rather than by the increment ADC 52.

MULTIPLEXING ADDITIONAL INCREMENT ADC'S

While the telemetering system 46 has been described with particular reference to a single increment ADC 52, as will be recognized by one skilled in the art, the multiplexing of additional increment ADC's is easily accomplished by providing a plurality of increment ADC's which may have bases other than gamma ray energy. For example, if a time base is used a time distribution will be obtained. In such case, where additional increment ADC's are employed, flag bits or leading 1's may be used to identify the source of the data and forward it to an appropriate portion of the memory unit 58.

I claim:

1. The method of transmitting well logging data uphole over a cable from a downhole tool having a digital memory unit having a multiplicity of individually addressable locations each capable of being written into and read from, comprising the steps of:
   assigning a plurality of said memory locations to the digital outputs of an increment ADC;
   initializing the data stored in said memory unit by writing an initializing signal into each of said assigned locations;
   applying analog well logging signals to said ADC;
   converting each said analog signal into a digital output corresponding to the address of an assigned memory location;
   incrementing any data previously stored in said assigned memory location in response to said digital output;
   reading out the data contained in the memory locations at a predetermined rate which is independent of the instantaneous rate at which said increment ADC will accept analog signals applied to it; and
   transmitting the data read out of the memory locations uphole on the cable at a rate within the data transmission capacity of the cable.

2. The method of claim 1 wherein:
   said analog signals are converted into digital outputs in parallel-bit form; and
   the incrementing step and the reading out step are carried out with said data in parallel-bit form.

3. The method of claim 2 wherein the converting step comprises converting said analog well logging signals into digital outputs in binary format.

4. The method of claim 2 wherein the transmitting step comprises:
   converting the data read out of the memory locations from parallel-bit form to serial bit form; and
   starting with the most significant bit suppressing leading zeros in said data prior to transmitting said data on the cable.

5. The method of claim 1 wherein the transmitting step comprises modulating a signal on the cable by said data in serial-bit form.

6. The method of claim 5 wherein:
   said data is transmitted starting with the most significant bit; and
   leading zeros in said data are suppressed before the modulation of said data on said cable signal.

7. The method of claim 1 further comprising the steps of:
   assigning a specific memory location to each of one or more sampling ADC's;
   applying analog well logging signals to each sampling ADC;
   converting said analog well logging signals into digital data; and
   storing said digital data in the memory location assigned to said each sampling ADC.

8. The method of claim 7 further comprising the step of multiplexing access to the memory unit between the increment ADC and said one or more sampling ADC's in response to signals from said increment ADC and said sampling ADC's which indicate their readiness to input data into said memory unit.

9. The method of claim 1 wherein the transmitting step comprises modulating said data on a cable signal in serial-bit form as a series of time-spaced data blocks, each of which data blocks includes a plurality of time-spaced data words corresponding to the data read out of individual memory locations and each of which data blocks is preceded by an identifier word which identifies the position of the data block within the series of data blocks.

10. Apparatus for use in transmitting well logging data uphole from a downhole tool suspended by a cable, comprising:
   a digital memory unit in said tool having a multiplicity of individually addressable locations each capable of being written into and read from;

means for initializing the data in each of said locations of said memory unit by writing an initializing signal into each of said locations;

means, including at least one increment ADC, for converting analog well logging signals into digital outputs each of which corresponds to the address of one of a plurality of said memory locations assigned to said converting means;

means for incrementing any data previously stored in said one memory location in response to said digital output;

means for reading out the data contained in the memory locations at a predetermined rate which is independent of the instantaneous rate at which said increment ADC will accept analog signals applied to it; and means for transmitting the data read out of the memory locations uphole on the cable at a rate within the data transmission capacity of the cable.

11. The apparatus of claim 10 wherein the transmitting means includes means for modulating a signal on said cable by said data in serial-bit form.

12. The apparatus of claim 11 wherein said transmitting means includes:

means for transmitting said data starting with the most significant bit; and means for suppressing leading zeros in said data before the modulation of said data on said cable signal.

13. The apparatus of claim 10 wherein the transmitting means includes means for modulating said data on a signal on said cable in serial-bit form as a series of time-spaced data blocks, each of which data blocks includes a plurality of time-spaced data words corresponding to the data read out of individual memory locations and each of which data blocks is preceded by an identifier word which identifies the position of the data block within the series of data blocks.

14. The apparatus of claim 13 wherein said modulating means restores the cable signal to the non-modulated level immediately preceding each data word and immediately preceding each identifier word.

15. The apparatus of claim 10 wherein the analog signal converting means includes:

a memory address register interposed between said increment ADC and the memory unit for receiving each digital output from said increment ADC preparatory to incrementing any data previously stored in the memory location corresponding thereto; and means responsive to the transfer of said digital output from the increment ADC to the memory address register for freeing said increment ADC to accept another analog input signal.

16. The apparatus of claim 10 further comprising means controllable from uphole for blocking access of said increment ADC to the memory unit and for thereafter entering known test data into the memory locations of said unit to provide a check on the reliability of data storage and data transmission to the surface.

17. The method of claim 9 wherein the cable signal is restored to the non-modulated level immediately preceding each data word and immediately preceding each identifier word.

18. The apparatus of claim 10 wherein:

said signal converting means comprises means for converting said analog signals into digital outputs in parallel-bit form; and said incrementing means, said memory unit and said reading out means are operative to handle said data in parallel-bit form.

19. The apparatus of claim 18 wherein the transmitting means includes:

means for converting the data read out of the memory locations from parallel-bit form to serial-bit form; and means starting with the most significant bit for suppressing leading zeros in said data prior to transmitting said data on the cable.

20. The apparatus of claim 18 wherein said signal converting means includes means for converting said analog signals into digital outputs in binary format.

21. The apparatus of claim 10 further comprising:

one or more sampling ADC's in the tool for receiving analog well logging signals;

means coupling each sampling ADC to a specific memory location in said memory unit; and means for storing the digital data from each sampling ADC into its assigned memory location.

22. The apparatus of claim 21 further comprising means for multiplexing access to said memory unit between the increment ADC and said one or more sampling ADC's in response to signals from said increment ADC and said one or more sampling ADC's which indicate their readiness to input data into said memory unit.

* * * * *